US009619488B2

(12) United States Patent
Ambardekar et al.

(10) Patent No.: US 9,619,488 B2
(45) Date of Patent: Apr. 11, 2017

(54) ADAPTABLE IMAGE SEARCH WITH COMPUTER VISION ASSISTANCE

(71) Applicant: Microsoft Technology Licensing, LLC, Redmond, WA (US)

(72) Inventors: Amol Ashok Ambardekar, Bellevue, WA (US); Christopher Leonard Huybregts, Kirkland, WA (US); Larry Wall, Seattle, WA (US); Damoun Houshangi, Bellevue, WA (US); Hrishikesh Pathak, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 499 days.

(21) Appl. No.: 14/163,999

(22) Filed: Jan. 24, 2014

(65) Prior Publication Data
US 2015/0213058 A1  Jul. 30, 2015

(51) Int. Cl.
*G06F 17/30* (2006.01)
*G06K 9/62* (2006.01)
*G06K 9/00* (2006.01)

(52) U.S. Cl.
CPC .... *G06F 17/30256* (2013.01); *G06F 17/3053* (2013.01); *G06F 17/3079* (2013.01); *G06F 17/3087* (2013.01); *G06F 17/30144* (2013.01); *G06F 17/30247* (2013.01); *G06F 17/30598* (2013.01); *G06K 9/00671* (2013.01); *G06K 9/6202* (2013.01); *G06K 9/6227* (2013.01); *G06K 2209/27* (2013.01)

(58) Field of Classification Search
CPC ........ G06F 17/30144; G06F 17/30864; G06K 9/00671
USPC ....................................................... 707/706
See application file for complete search history.

(56) References Cited

U.S. PATENT DOCUMENTS

| 8,526,677 B1 | 9/2013 | Crichton et al. |
| 2008/0267504 A1 | 10/2008 | Schloter et al. |
| 2012/0093369 A1 | 4/2012 | Ryu |
| 2012/0268492 A1 | 10/2012 | Kasahara |
| 2013/0215116 A1 | 8/2013 | Siddique et al. |

OTHER PUBLICATIONS

Sivic, J., et al., "Efficient Visual Search for Objects in Videos", In Proceedings of the IEEE, vol. 96, Issue 4, pp. 548-566, Apr. 2008, 19 pages.

(Continued)

*Primary Examiner* — Shahid Alam
(74) *Attorney, Agent, or Firm* — Alleman Hall McCoy Russell & Tuttle LLP (57) ABSTRACT

A computing device having adaptable image search and methods for operating an image recognition program on the computing device are disclosed herein. An image recognition program may receive a query from a user and a target image within which a search based on the query is to be performed using one or more of a plurality of locally stored image recognition models, which are determined to be able to perform the search with sufficiently high confidence. The query may comprise text that is typed or converted from speech. The image recognition program performs the search within the target image for a target region of the target image using at least one selected image recognition model stored locally, and returns a search result to the user.

20 Claims, 9 Drawing Sheets

(56) References Cited

OTHER PUBLICATIONS

Kelly, B., "How Evernote's Image Recognition Works", https://blog.evernote.com/tech/2013/07/18/how-evernotes-image-recognition-works/, Jul. 18, 2013.
Hickey, K., "Quick Tip: How to Search for Text Inside an Image", https://blog.evernote.com/blog/2013/10/11/quick-tip-how-to-search-for-text-inside-an-image/, Oct. 11, 2013.
ISA European Patent Office, International Search Report and Written Opinion issued in PCT/US2015/012331, Mar. 31, 2015, Netherlands, 12 Pages.
Bigham, Jeffrey P. et al., "VizWiz::LocateIt—Enabling Blind People to Locate Objects in Their Environment", Proceedings of the Computer Society Conference on Computer Vision and Pattern Recognition Workshops, Jun. 13, 2010, 8 pages.
Caperna, Steve et al., "A Navigation and Object Location Device for the Blind", PhD Thesis, May 2009, 129 pages.
Foo, Grace Sze-en, "Grocery Shopping Assistant for the Blind/Visually Impaired (GroZi)", http://grozi.calit2.net/files/TIESGroZiSu09.pdf, Available as early as Sep. 5, 2009, Accessed Nov. 25, 2013, 32 pages.
Henze, Neils, "Camera-based Mobile Interaction with Physical Objects", Oldenburg Computer Science Series, Jul. 19, 2012, 182 pages.
Plante, Edouard, "Combining Technology and Ethnography for the Visually Impaired", Business 2 Community, http://www.business2community.com/tech-gadgets/combining-technology-ethnography-visually-impaired-0632793, Oct. 8, 2013, 6 pages.
Wang, Yang et al., "JIGSAW: Interactive Mobile Visual Search with Multimodal Queries", Proceedings of the 19th ACM International Conference on Multimedia, Nov. 28, 2011, 10 pages.
IPEA European Patent Office, Second Written Opinion Issued in PCT Application No. PCT/US2015/012331, Jan. 20, 2016, WIPO, 8 Pages.
IPEA European Patent Office, International Preliminary Report on Patentability issued in PCT Application No. PCT/US2015/012331, Apr. 25, 2016, WIPO, 9 pages.

ADAPTABLE IMAGE SEARCH WITH COMPUTER VISION ASSISTANCE

BACKGROUND

Image searching technologies may enable a user to obtain information about an object in an image or locate a specific object within the image. The same process may be applied to people, scenes, text, etc. Typical image recognition services operate by receiving an image from the user, analyzing the image for distinctive features, and then matching the object in the image against images in a database using algorithms.

As digital camera sensors and memory capacity have improved, the sizes of the images captured by digital cameras have increased. Currently, some camera-equipped smartphones capture images of over 40 megapixels. Uploading an image of this size to a cloud-based service usually takes significant time and bandwidth, especially if done over a cellular network, which often incurs additional cost to the user. Once such a large image is uploaded, an image recognition service may take extra time and computational power to process the image as compared to a smaller image, which slows response time down. Additionally, since the image is sent over a network, issues related to privacy can arise. As a result, significant challenges exist for cloud-based image search services to be applied to large images captured on next generation cameras.

SUMMARY

A computing device having adaptable image search and methods for operating an image recognition program on the computing device are disclosed herein. One disclosed embodiment may include non-volatile memory configured to store a plurality of image recognition models and the image recognition program executed by a processor of the computing device. The image recognition program may receive a query from a user and a target image within which a search based on the query is to be performed. The query may comprise text that is typed or converted from speech.

The image recognition program may then rank the image recognition models by confidence level for performing the search within the target image and determine whether any of the image recognition models is above a confidence threshold for performing the search locally on the processor of the computing device. If it determines that at least one of the image recognition models is above the confidence threshold, the image recognition program may select at least one highly ranked image recognition model. Then, the image recognition program may perform the search within the target image for a target region of the target image using at least one selected image recognition model, and finally, return a search result to the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
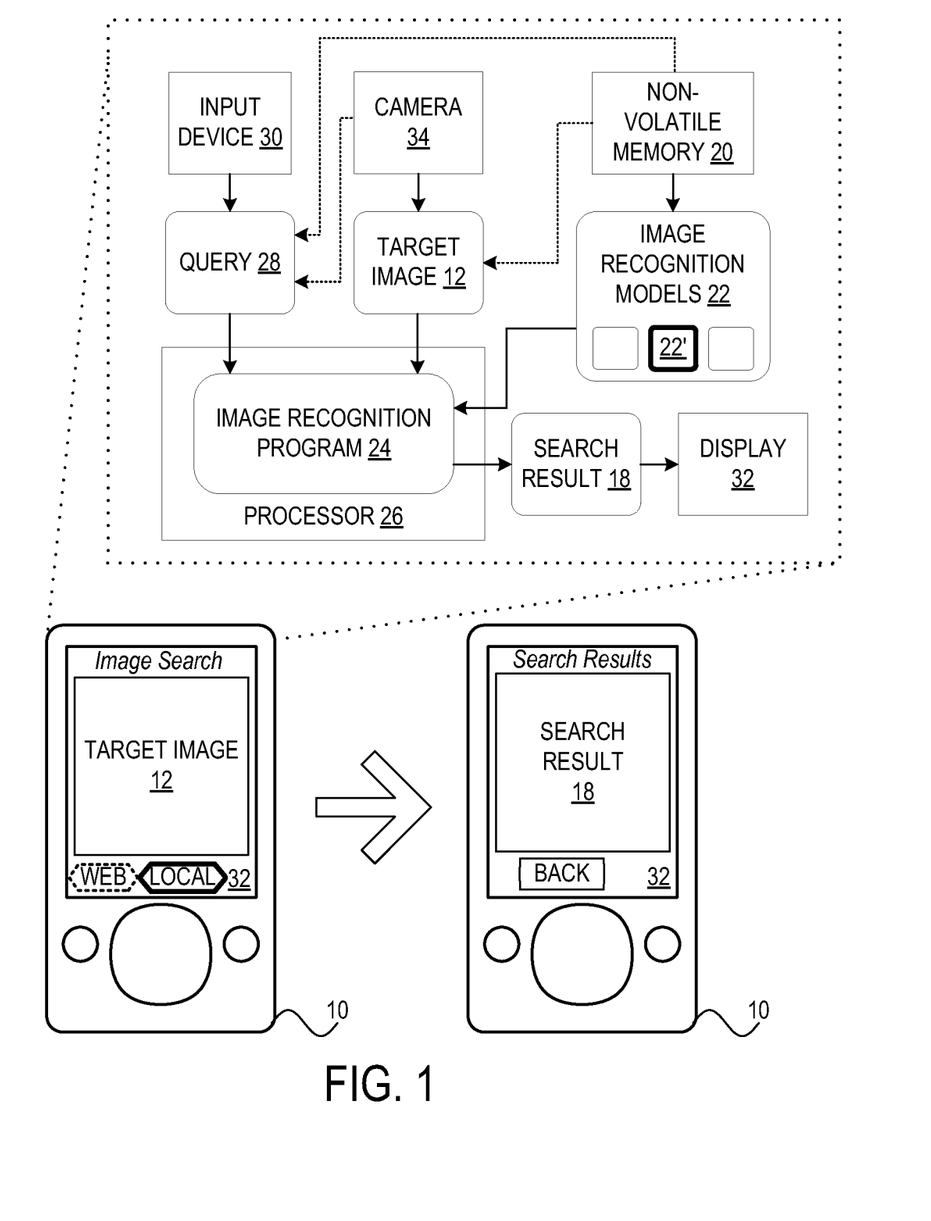
FIG. 1 is a schematic view of a computing device performing a local image recognition search.
Figure 2:
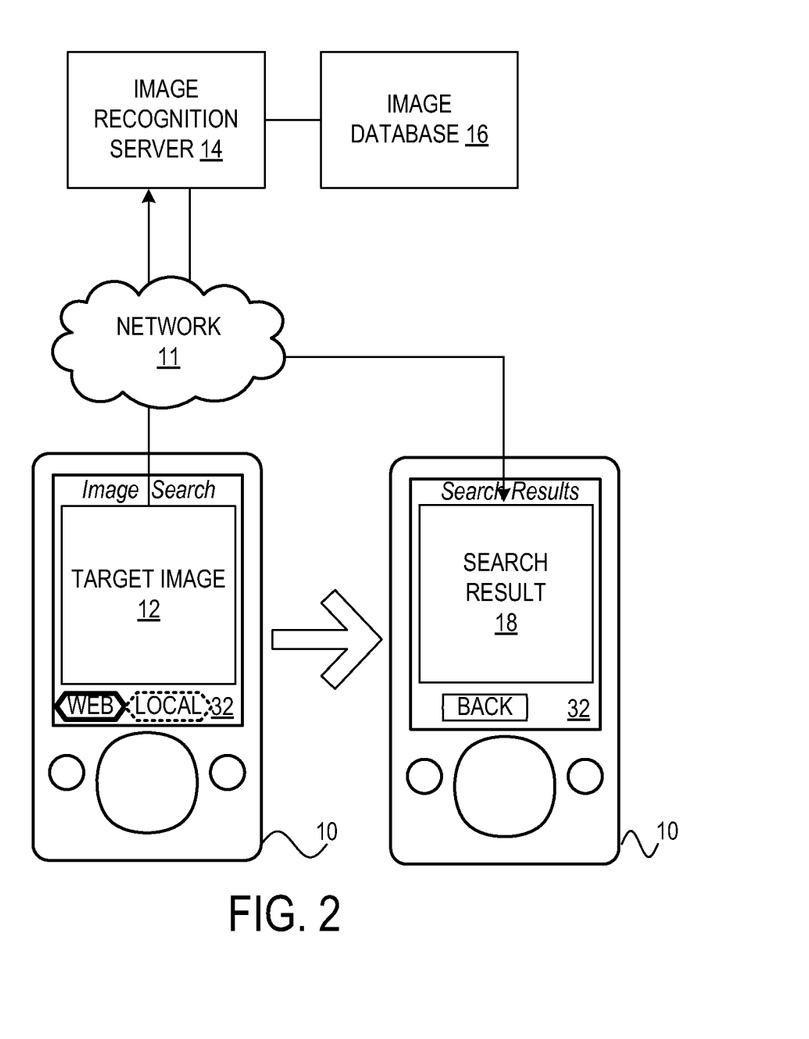
FIG. 2 is a schematic view of the computing device of FIG. 1 performing a web-based image recognition search.

FIGS. 1 and 2 are schematic views of a computing device 10 configured with adaptable image search functionality that is able to perform a local image recognition search that uses different models stored locally to conduct the image search, and also optionally to conduct a web based image recognition search. In one embodiment, the computing device 10 is configured to present the user with an option for local image recognition search, and if such a local image recognition search cannot be performed with high confidence, then instead present an option to the user for conducting a web-based image recognition search, or programmatically perform a web search without requiring the user to select a web search option. It will be appreciated that by affording the user the option to first attempt to conduct image recognition searches locally in this manner, the computing device 10 potentially addresses the challenges discussed above involving the transmission of large size images over a network to a web based image recognition server. In some embodiments, the option for a web based image recognition search is not presented until after the local search has been ruled out as not available, and in other embodiments, the option for both web based and local searching are presented to the user concurrently from the beginning of the image search interaction dialog.

FIG. 1 shows computing device 10 presenting the user with options of performing an image recognition search on the web or locally for a target image 12 displayed on the computing device 10. The user may select the target image 12 from a suitable source, such as a camera output or data store in non-volatile memory 20 on the computing device 10. A plurality of image recognition models 22 may also be stored in the non-volatile memory 20. Each image recognition model 22 may include an image recognition algorithm, an optical character recognition (OCR) algorithm, and/or a keyword matching algorithm, among others. Each image recognition model 22 may contain only one algorithm or any combination of multiple algorithms of the same or differing type.

An image recognition program 24 executed on processor 26 of the computing device 10 may display an image search GUI on display 32, which may include a graphical user interface (GUI) selector labeled LOCAL. Selection of the LOCAL selector by a user may trigger a local image recognition search. Alternatively, the local image recognition search may be selected using another type of command such as a voice or gesture command.

The image recognition program 24 may be configured to receive a query 28 from a user. An input device 30 of computing device 10 may include a microphone, a keyboard, a touchscreen, etc. The query 28 may be, for example, text that is typed on the keyboard or touchscreen, converted from speech captured by the microphone, converted via optical character recognition (OCR) from an image that may be, for instance, captured by the camera 34 or stored in the non-volatile memory 20, or produced by other techniques. Audio, text, etc. may also be stored in the non-volatile memory 20 in advance and then used to form a query 28. Alternatively, the query 28 may be an image or video of a target object the user is interested in finding. Multiple images or frames of video may depict different viewpoints of the same target object. The user may optionally select a bounding box within the query image to help the image recognition program 24 to locate the target object, especially if there are many irrelevant objects in the image.

The image recognition program 24 may also receive a target image 12 within which a search based on the query 28 is to be performed. As described above, the target image 12 is typically preselected by the user, and may originate from an onboard camera, or may be selected from a stored folder of images, etc., and the search is to find the target object, etc., that may be located within the target image 12. The location of the target object, etc., within the target image 12 may be referred to as a target region of the target image 12.

Next, the image recognition program 24 may rank the image recognition models 22 by confidence level for performing the search based on the query 28 within the target image 12, then determine whether any of the image recognition models 22 is above a confidence threshold for performing the search locally on the processor 26 of the computing device 10. Upon determining that at least one of the image recognition models 22 is above the confidence threshold, the image recognition program may select at least one highly ranked image recognition model 22' and perform the search within the target image 12 for a target region of the target image 12 using at least one selected image recognition model 22'.

The confidence level of the image recognition models 22 may be influenced by a number of factors. For instance, the image recognition program 24 may run one or more light weight processes (i.e., less computationally intensive algorithms) to classify objects in the target image 12 and/or the query 28. One example of such a light weight process may be a face detection algorithm to detect whether any faces are present in the target image 12. If the query 28 is resolved to be a person's name, then a light weight process could be run to determine whether any faces are present in the image, and if so, then one or more of the image recognition models 22 containing a more complex facial recognition algorithm may be selected for performing the search of the image for the person matching the name in the query. In another example, if the query 28 is the name of a brand of cereal, then image recognition models 22 including 2-D image matching algorithms configured to detect rectangular shapes of a particular color may be determined to have a higher confidence level.

The image recognition models 22 may also include text descriptions that may be compared to the query 28. Additionally, the image recognition program 24 may show the user the image on which one of the image recognition models 22 was based. For example, if the query 28 is "bass," then the user may be shown images of a fish and a musical instrument on display 32 and the user may choose the one to which he was referring. In such a manner, the image recognition program 24 may optionally suggest multiple image recognition models 22 with high confidence levels to the user, and the user may select at least one image recognition model 22' for performing the search. Having a plurality of image recognition models 22 stored on the computing device 10 and ready to be used even in the absence of a network connection may speed up the search. Different image recognition models 22 may work better for different queries 28, and using the right selected image recognition model 22' for the job may lead to less time and computational power being spent on performing the search.

Finally, the image recognition program 24 may return a search result 18 to the user, which may include displaying it on display 32 and ending the search. The visual displaying of the search result 18 may be accompanied by an audio alert or reporting of the search result 18, or a vibration, for example. At any time prior to receiving the search result 18, the user may indicate to the image recognition program 24 that she wishes to end the search.

The computing device 10 is depicted as a smartphone in this embodiment, but it may be any suitable device, including other mobile devices such as a tablet or laptop computer; a wearable device such as a watch, head-mounted display (HMD) device, or other wearable computing device; or a stationary device such as a desktop computer. The image recognition program 24 may display the search result 18 on the display 32, which may be an organic light emitting diode (OLED) display, liquid-crystal display (LCD), or head-up display (HUD), for example. The computing device 10 may also comprise a camera 34, and the target image 12 may be captured by the camera 34, as in this embodiment. The target image 12 may be a single image or one or a plurality of image frames that constitute a portion of a video.

Secondary signals such as global positioning system (GPS) data and wireless network service set identifiers (SSIDs) associated with known geographic locations, for example, may be associated with the image recognition models 22. The image recognition program 24 may use location information about the user or other users via these associated secondary signals. For instance, the image recognition program 24 may check to see if other users have submitted a similar query and where they were (e.g., as determined by an SSID known to a geolocation service) when they found an object that the user is searching for, and then relay this information to the user. Such an object may be a physical, inanimate object, but it may also be a person, animal, scene, portion of text, etc. Secondary signals may aid in image recognition model 22 confidence ranking and selection by providing context for the search. For example, if the user is determined through secondary signals to be at a museum, image recognition models with 2-D image matching algorithms may be highly ranked by the image recognition program 24 to accurately complete a search for specific paintings.

The other users discussed above whose data may be used to conduct the image search may be anonymous users that have submitted feedback to a web service associated with the image recognition program 24, other users in the user's contacts, or other users in the user's social media networks, for example. In another example, the image recognition program 24 may not begin processing the query 28 until the user's current location as determined through a GPS signal has reached a predetermined location where the image recognition program 24 should look for the object the user desires.

In some instances, the target image 12 may be an image or video of the user's current surroundings and the query 28 may indicate a desired product or destination. For example, the user, Jane, may set up a shopping list at home using a wireless network. In this case, the image recognition program 24 may receive one query 28 per item on the shopping list. Jane may capture images of items that are running low with the camera 34 on her HMD device, and then the image recognition program 24 may use OCR to extract text from the images and form a number of queries 28. Alternatively, Jane may capture one single image of a written shopping list or of all of the items she wants to find at the store and each query 28 may be generated from the same image. The image recognition program 24 may ready the selected image recognition model 22' for each item as described above.

Once the image recognition program receives an indication that Jane has arrived at the store, whether automatically by receiving the GPS signal or geolocated SSID or by Jane directly commanding the image recognition program 24 to proceed, the HMD device may use its camera 34 to send a constant video feed or intermittently captured images to the image recognition program 24 for processing. In this case, the target region of the target image 12 may contain an image of one of the items on the shopping list. When the search result 18 is returned to Jane—for instance, as the target image 12 displayed on display 32 with the target region circled and an accompanying beep sound—Jane may indicate to the image recognition program 24 that the item just located may be removed from the shopping list. In this manner, Jane may finish her shopping.

In another example, the user, Kazu, may have a dinner appointment at a restaurant in an unfamiliar area. Kazu may indicate or otherwise describe the restaurant to his computing device 10 with a HUD on his car windshield through a microphone. The image recognition program 24 may convert the speech to text to form a query 28. A suitable image recognition model 22' may be determined and selected as described above. The image recognition program 24 may use Kazu's associated GPS signal and an estimated or determined location of the restaurant to indicate to Kazu that he is nearing his destination.

Using GPS alone may not always end in a successful trip, with imprecise directions and sudden movements made in response by the user. However, Kazu's computing device 10 may take single images or a video of the street he is on and the image recognition program 24 may use those images or frames of the video as target images 12. When the image recognition program 24 locates the target region of the target image 12 containing the restaurant, the search result 18 may be displayed on Kazu's HUD, clearly indicating exactly where the restaurant is located so that Kazu may safely and easily arrive at his destination.

In another example, the query 28 may include a directive to search for target regions in the target image 12 or in other images that are similar to the target region in the target image 12. In such a case, the user may already have or know of one object that she does not wish to find. Rather, she wants recommendations for a similar object. The recommendations may be chosen by the image recognition program 24 performing a simple web search or searching through aggregated feedback from multiple other users, for example. The image recognition program 24 may present the user with multiple options and allow the user to choose one or more recommended objects, or the image recognition program 24 may determine a most desirable object or a few desirable objects. Alternatively, the query 28 may be formed based on one or more images of the object that the user does not wish to find, but is instead similar to the object that the user does wish to find. If an image recognition model 22' with a confidence level above the predetermined threshold does not exist on the computing device 10, then one may be downloaded or created as described below in detail with reference to FIGS. 4 and 5.

Turning now to FIG. 2, if the local search option is determined to be unavailable due to a determination by the local image recognition program 24 that an estimated degree of confidence in locally available search models is below a minimum threshold, then the user may be presented with a GUI selector labeled WEB, by which the user may choose a web based image recognition search. Of course, as discussed above, the WEB selector may be presented to the user earlier in the interaction process, to afford the user the option to forgo local searching and proceed directly to a web based search. Furthermore, in some embodiments, the web based search may be programmatically executed upon determining that a local search option is not available with the minimum degree of confidence, without necessitating user input via the WEB selector.

Upon receiving a user selection of the WEB selector, the computing device 10 is configured to send the target image 12 preselected by the user to a web image recognition service 14, which executes the requested search using an associated image database 16. The target image 12 is typically sent over a network connection 11, such as a cellular network connection coupled to a wide area network (WAN) such as the Internet. The server generates search results 18 and sends them back to the computing device 10 via the network 11. The computing device 10 may then receive search results 18 and display the search results 18 on a display 32.

It will be appreciated that by providing both a local search option and a web search option in the above described manner, the challenges discussed in the Background may be mitigated. Specifically, with local search the target image 12 is not sent over a network, saving bandwidth and time, and as a result, possibly saving additional user fees. Second, local search offers the user robust privacy protection for the user's data by keeping the target image stored locally without sending it to a web service. Third, for the operator of the search service, server-side resources are potentially saved if users conduct searches locally rather than on the servers of the search service.

Figure 3:
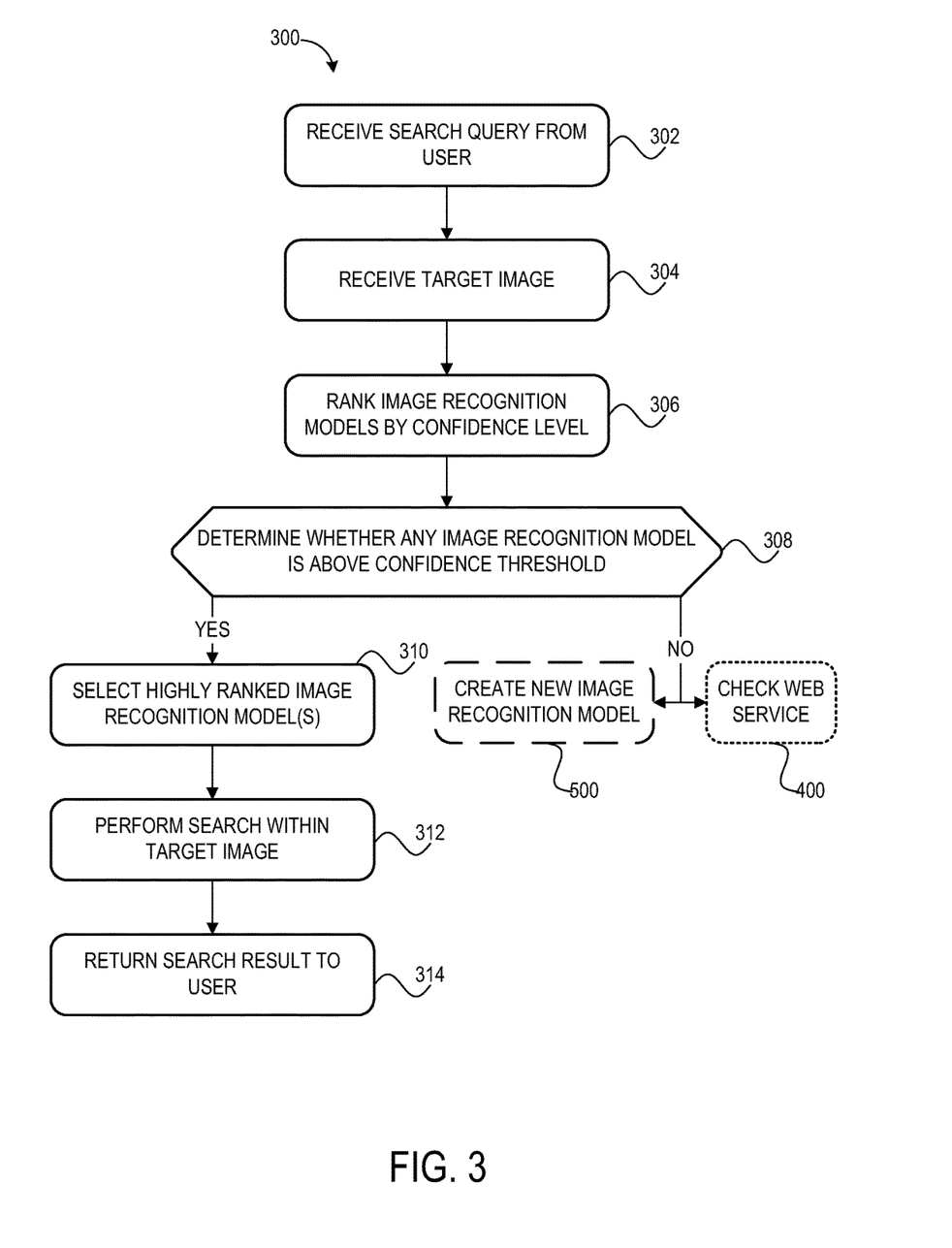
FIG. 3 is a flowchart of a method for operating an image recognition program on the computing device of FIG. 1 or other suitable hardware.

FIG. 3 is a flowchart of a method 300 for operating an image recognition program on a computing device having adaptable image search. The following description of method 300 is provided with reference to the software and hardware components of the computing device 10 described above and shown in FIG. 1. It will be appreciated that method 300 may also be performed in other contexts using other suitable hardware and software components.

With reference to FIG. 3, at 302 the method 300 may include receiving a query from a user. The query may comprise text that is typed, converted from speech captured by a microphone, converted from an image via optical character recognition (OCR), or produced by other techniques. At 304 the method 300 may include receiving a target image. The target image may be an image or video within which a search based on the query is to be performed. For example, the target image may be an image or video of the user's current surroundings and the query may indicate a desired product or destination.

The computing device may comprise a camera, and the target image may be captured by the camera. Alternatively, the target image may be selected from a stored folder of images, etc. The computing device may be a smartphone, tablet, laptop computer, other mobile device, watch, head-mounted display (HMD) device, other wearable computing device, or desktop computer, for example.

At 306 the method 300 may include ranking a plurality of image recognition models by confidence level for performing the search based on the query within the target image. The image recognition models may be stored in non-volatile memory of the computing device. Each image recognition model may include one or more image recognition algorithms, an optical character recognition (OCR) algorithm, and/or a keyword matching algorithm, among others. Image recognition algorithms may include face matching algorithms, two-dimensional (2-D) model matching algorithms, three dimensional (3-D) model matching algorithms, neural net algorithms, image segmentation algorithms, barcode recognition algorithms, quick response (QR) code detectors and decoders, and/or other algorithms, for example. At 308 the method 300 may include determining whether any of the image recognition models is above a confidence threshold for performing the search locally on a processor of the computing device.

The confidence level of the image recognition models may be influenced by a number of factors, as described above. For instance, the image recognition program may run one or more light weight processes, for example, a face detection algorithm, to classify objects in the target image and/or the query. The image recognition models may also include text descriptions that may be compared to the query. Additionally, the image recognition program may show the user the image on which one of the image recognition models was based. In such a manner, the image recognition program may optionally suggest multiple image recognition models with high confidence levels to the user, and the user may select at least one image recognition model for performing the search.

Upon determining that at least one of the image recognition models is above the confidence threshold (yes at 308), at 310 the method 300 may include selecting at least one highly ranked image recognition model. Multiple image recognition models may be ranked above the confidence threshold and some or all of such image recognition models may be selected for use in the same search. Alternatively, only the highest ranked image recognition model may be selected, or the user may choose from among a selection of highly ranked image recognition models. At 312 the method 300 may include performing the search within the target image for a target region of the target image using at least one selected image recognition model. In addition to the image recognition models, the image recognition program may also use location information about the user or other users via secondary signals associated with the image recognition models, such as GPS data and SSIDs.

Figure 4:
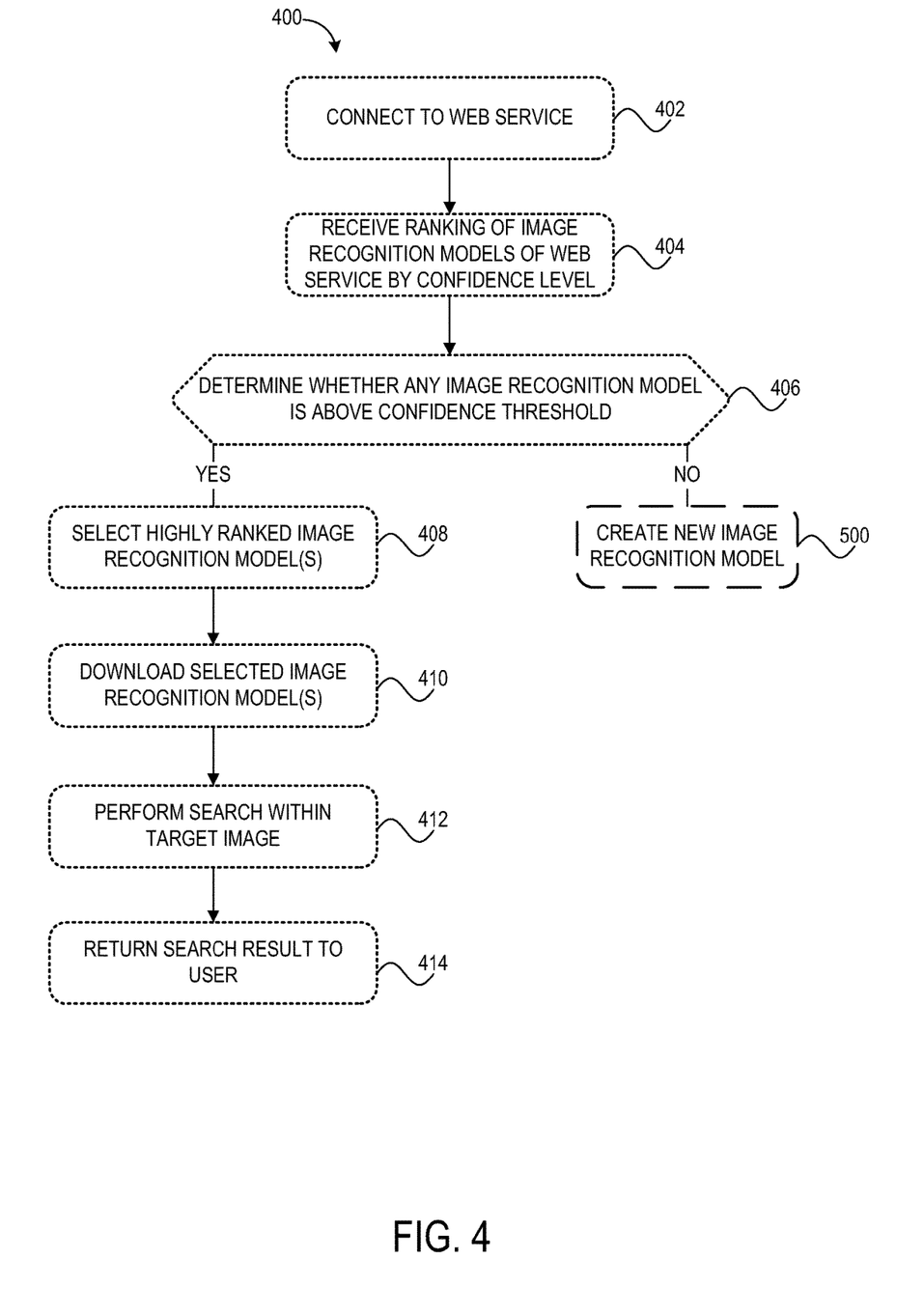
FIG. 4 is a flowchart that expands upon a step of the flowchart of FIG. 3, and illustrates a method for downloading an image recognition model from a web service.
Figure 5:
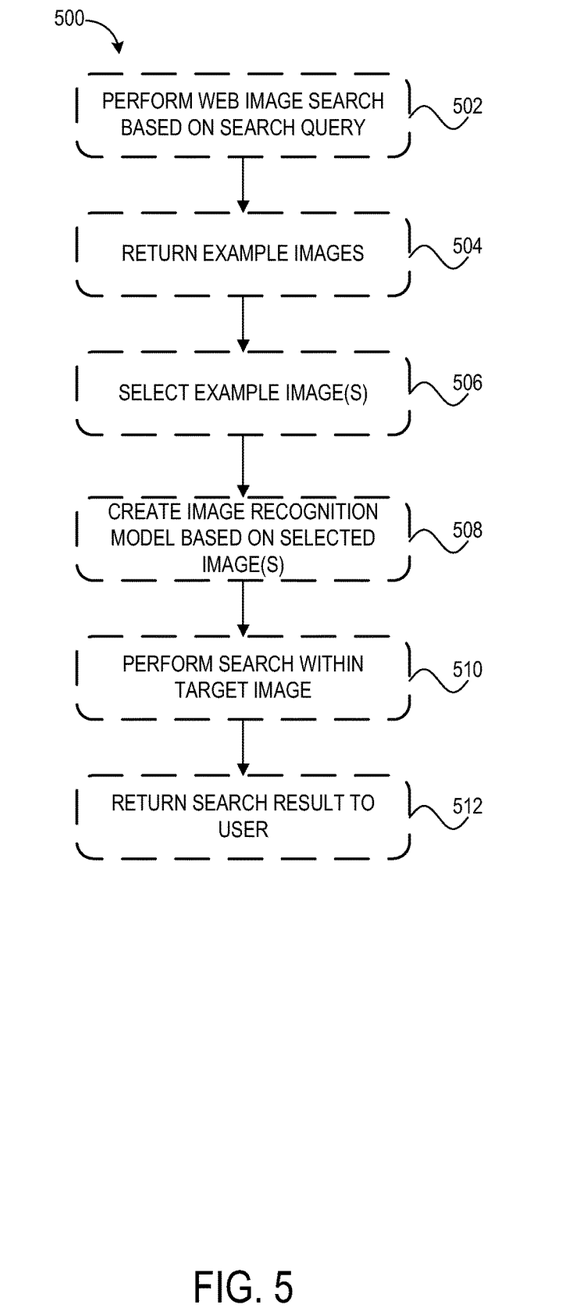
FIG. 5 is a flowchart that expands upon a step of the flowchart of FIG. 3, and illustrates a method for creating a new image recognition model based on example images from a web image search.

At 314 the method 300 may include returning a search result to the user, which may include the image recognition program displaying the search result on a display such as a liquid-crystal display (LCD) or a head-up display (HUD), for example. After this step, user feedback may be recorded and used to improve accuracy of image recognition model selection. On the other hand, upon determining that none of the image recognition models is above the confidence threshold (no at 308), the method 300 may proceed to checking a web service as illustrated at step 400, or to creating a new image recognition model as illustrated at step 500.

FIG. 4 is a flowchart illustrating substeps of the step 400 of checking a web service of a method 300 of FIG. 3, for retrieving new image recognition models from the web service. At 402 the step 400 may include connecting to the web service. The web service may include a plurality of image recognition models. At 404 the step 400 may include receiving a ranking of image recognition models of the web service by confidence level for performing a search based on the query within the target image. At 406 the step 400 may include determining whether any of the image recognition models of the web service is above a confidence threshold for performing the search, as described above with respect to method 300.

Upon determining that at least one of the image recognition models of the web service is above the confidence threshold (yes at 406), at 408 the step 400 may include selecting at least one highly ranked image recognition model of the web service. At 410 the step 400 may include downloading at least one selected image recognition model to the computing device. As above in method 300, one or multiple image recognition models may be selected and used in the search. At 412 the step 400 may include performing the search within the target image for a target region of the target image using at least one downloaded image recognition model. At 414 the step 400 may include returning a search result to the user. On the other hand, a "no" decision at 406 may include proceeding to create a new image recognition model as illustrated at step 500.

Alternatively to or in conjunction with step 400, new, popular, promoted, or otherwise selected image recognition models may be delivered to the computing device on a basis other than case-by-case. For example, new or improved image recognition models may be packaged as updates for the image recognition program and the user may be prompted to download the updates at regular intervals, the image recognition program may be configured to download the updates automatically, or the user may be able to choose among model packages based on what appeals to him. Updating the image recognition models may include updating, replacing, or adding to the algorithms included with the image recognition models, for example. Image recognition models may also be downloaded or updated on the device based on secondary signals such as GPS data, SSIDs associated with known geographic locations, ambient noise, etc.

FIG. 5 is a flowchart of a step 500 of method 300 of FIG. 3 for creating a new image recognition model. For instance, in the above example of Jane going shopping, perhaps Jane wishes to buy one new item that she has only heard about from a friend. She may not have a suitable image recognition model for the new item on her HMD device and the web service may not yet have one available for download, either. In this case, Jane may wish to create a new image recognition model.

At 502 the step 500 may include performing a web image search in an image search engine, wherein the web image search is based on the query. At 504 the step 500 may include returning a predetermined number of example images. The predetermined number may be set by the user or the image recognition program. At 506 the step 500 may include selecting at least one example image from the predetermined number of example images. The selection may occur by allowing the user to indicate which of the example images best represents the query, or by the image recognition program choosing intelligently according to programmatic rules and/or user preferences. If the image recognition program chooses, user feedback may be recorded at this step to improve this function.

Programmatic rules may take into account context of previous queries. For example, if the previous 10 queries from the user contained books, and the current query likely indicates either a book or a car, the image recognition program may choose the example image of a book. In another example, programmatic rules may take into account secondary signals. If the GPS data indicates that the user is at a bookstore, then the image recognition program may choose the example image of a book. If the user is at a car dealership, then the image recognition program may choose the example image of a car.

At 508 the step 500 may include creating an image recognition model based on at least one selected example image. The user may optionally enter a text phrase or caption to describe the created image recognition model. At 510 the step 500 may include storing the created image recognition model in the non-volatile memory of the computing device. The created image recognition model may optionally be uploaded to the web service to be shared with other users. At 512 the step 500 may include performing the search within the target image for a target region of the target image using the created image recognition model. At 514 the step 500 may include returning a search result to the user.

Next, some example use case scenarios will be described with reference to illustrations in FIGS. 7-9. These use case scenarios are exemplary in nature and are not intended to be used to limit the scope of the claimed subject matter.

Figure 7:
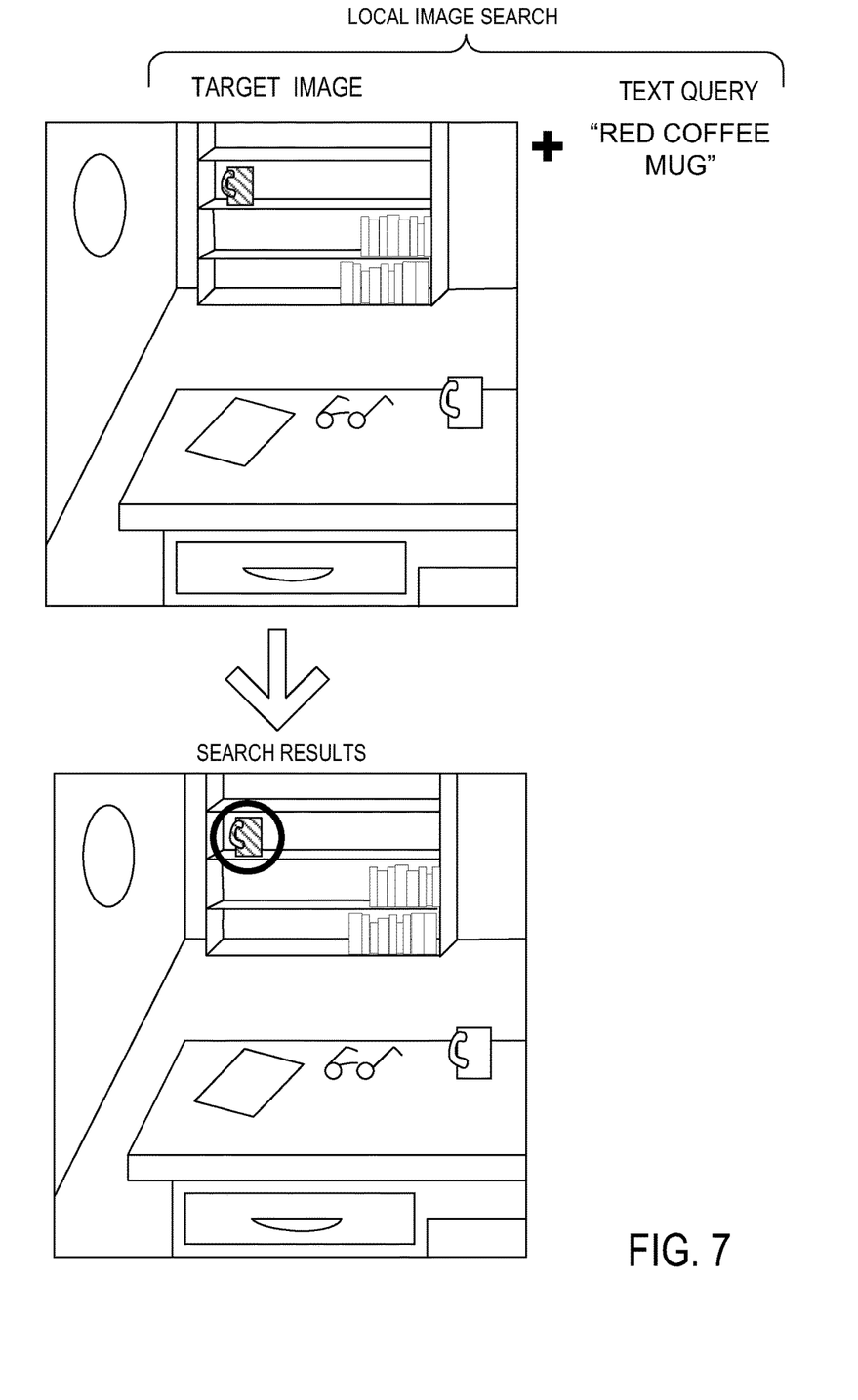
FIG. 7 illustrates an example use case scenario of an image recognition search for a red coffee mug.

First, FIG. 7 illustrates an example image recognition search for a red coffee mug by a user, Ariana. Ariana has a favorite red coffee mug she likes to use every morning. Lately, she has been using a blue one that she doesn't like as much. One day, she may decide to use her favorite red coffee mug again and be unable to remember where she left it.

First, Ariana may open the image recognition program installed on her smartphone. The image recognition program may prompt her to submit a query, so Ariana may interact with a digital keyboard by using a touchscreen on her smartphone to type "red coffee mug." Additionally, Ariana may take a picture of the room where she thinks she left the red coffee mug using a built-in camera on her smartphone. The image recognition program may process the picture of Ariana's room as a target image, using the typed text as a query.

The image recognition program may select a suitable image recognition model for finding the red coffee mug and perform the search for Ariana. Selecting only a suitable image recognition model may aid the image recognition program in locating the red coffee mug and not the blue one instead. Once the search completes, the image recognition program may display the picture Ariana took and circle the location of the red coffee mug. In case Ariana is not paying attention, the smartphone may vibrate to alert her.

Figure 8:
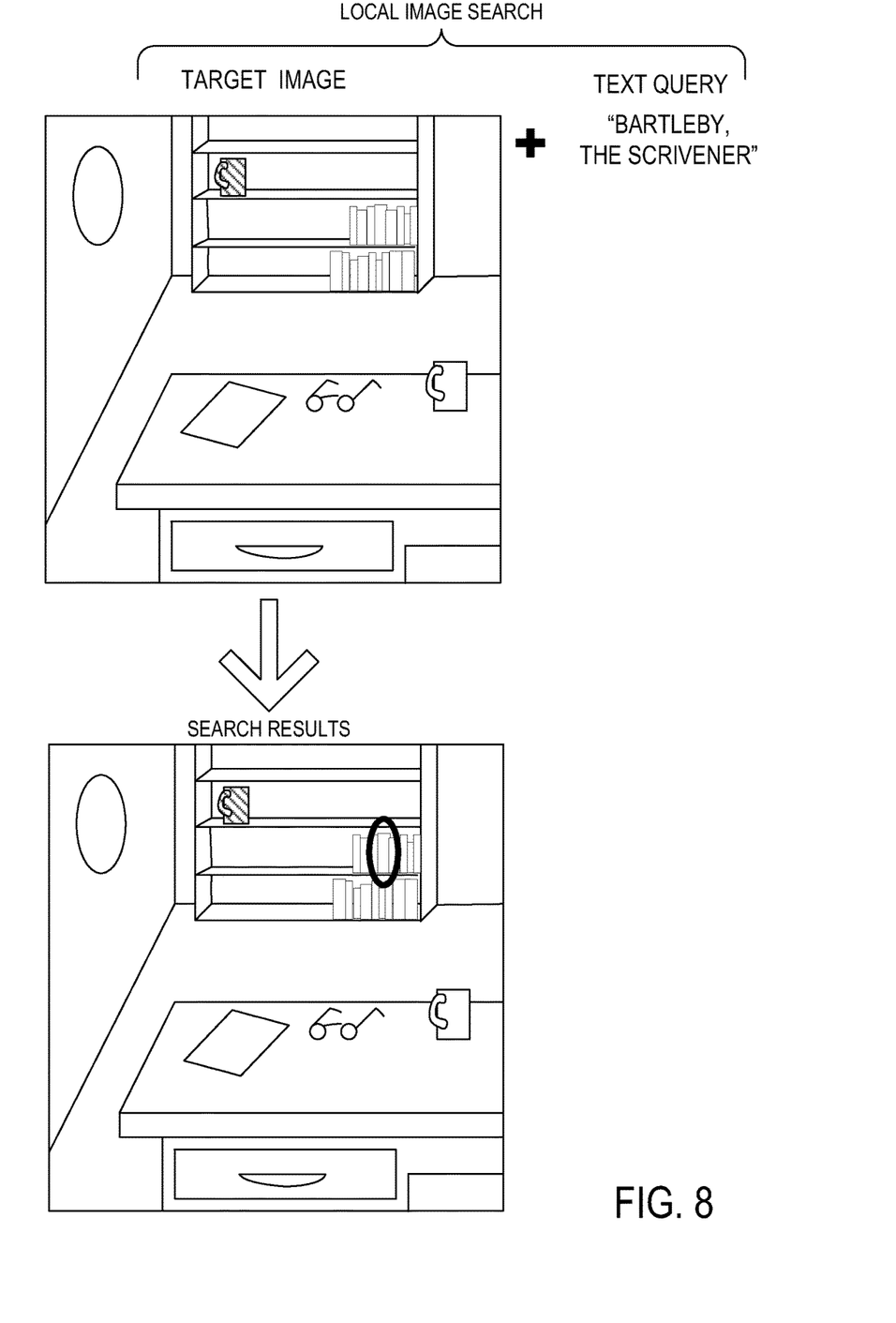
FIG. 8 illustrates another example use case scenario of an image recognition search for a particular book.

FIG. 8 illustrates an example image recognition search for a book by the same user. This time, Ariana may be at a bookstore and not have access to her bookshelf. She may see that a book, *Bartleby, the Scrivener*, is on sale at the bookstore and wish to purchase a copy for herself. However, she may not be sure whether or not she already owns a copy of the book. Luckily, Ariana may still have the picture she took of her room saved on her smartphone. She may try zooming in on the books on her bookshelf to read the titles on the spines of the books, but she may be in a hurry and not wish to read all of the titles.

Instead, Ariana may submit the same picture, this time saved on her smartphone, to the image recognition program. She may again use the touchscreen to type a query, this time, "Bartleby, the Scrivener." In this instance, Ariana may not have a suitable image recognition model already loaded on her smartphone, so the image recognition program may connect to the web service via a wireless network. The image recognition program may select and download an image recognition model with an OCR algorithm that may extract text from the spines of the books in the picture and compare them to the text Ariana submitted. Once the search completes, the image recognition program may display the picture Ariana took and circle the location of only the book she is looking for. As before, the smartphone may vibrate to alert her so that Ariana will not buy another copy of the same book.

Figure 9:
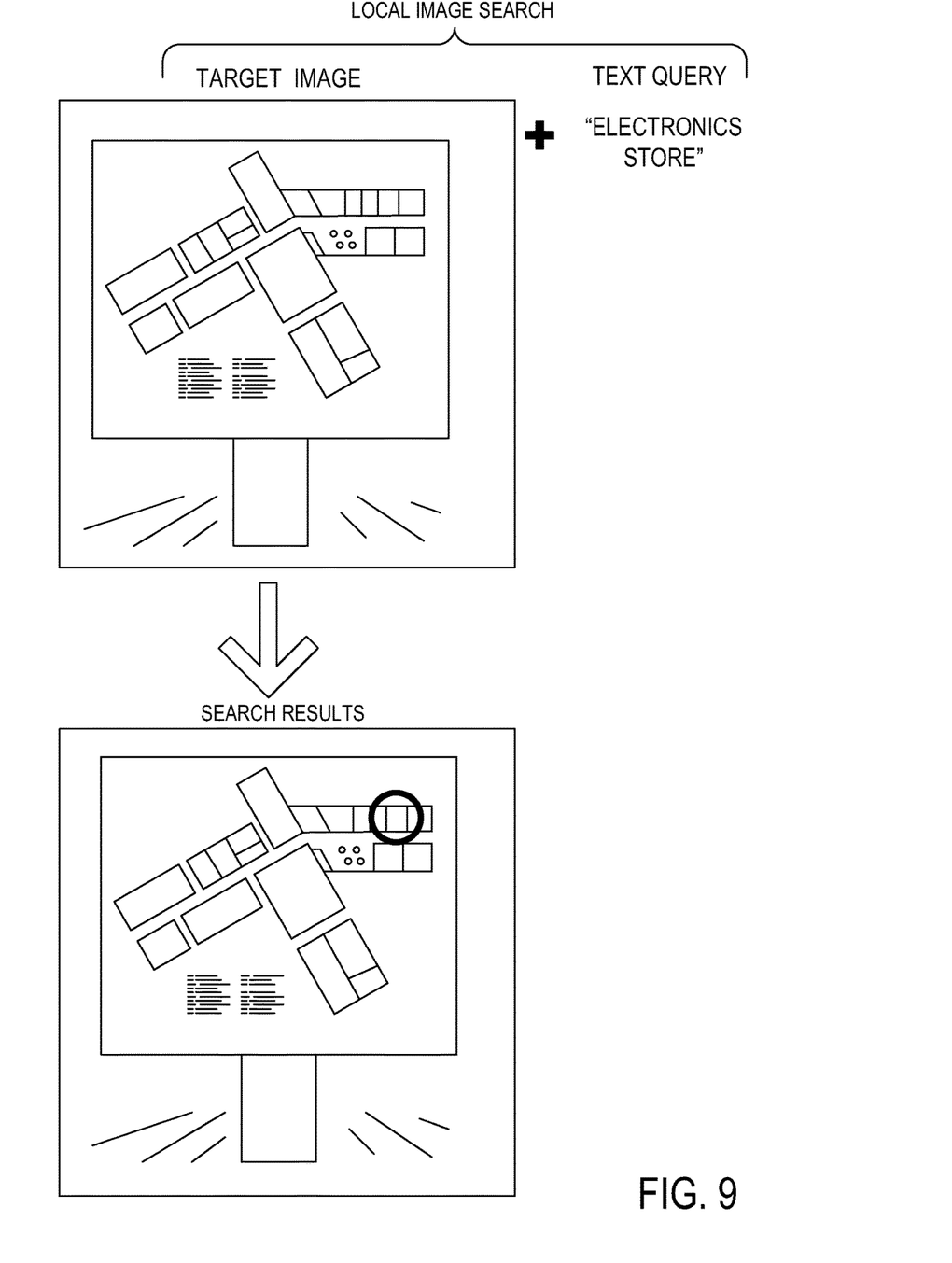
FIG. 9 illustrates another example use case scenario of an image recognition search for an electronics store at a mall using a mall directory.

FIG. 9 illustrates an example image recognition search for an electronics store in a mall by another user, Ramzi. Ramzi is in a mall in a foreign country and he does not know the local language very well. He may need a replacement cord for an electronic device, so he may wish to visit an electronics store. Ramzi may walk up to a mall directory while wearing his HMD goggles and look at a map of the mall. The image recognition program may take frames from a video captured by the goggles and use at least one of the frames as a target image. An on-board microphone in the goggles may be used to capture Ramzi's verbal query of "electronics store," which may then be converted to a text query.

A suitable image recognition model may be selected by the image recognition program. The image recognition program may then use an OCR algorithm to extract text from the video frame and then translate the directory. A listing determined to correspond with an electronics store may be highlighted on Ramzi's HMD and an audio alert such as a beep, chirp, or verbal reporting of the result may be produced by the goggles. Additionally, since Ramzi may actually want the location of the electronics store on the map of the directory, not just the listing, the image recognition may return the search results to Ramzi by circling the location on the map corresponding to the listing of the electronics store on the HMD. The circle around the location may flash, be in a distinctive color, or otherwise be set apart from the surrounding view through Ramzi's HMD. The circle may be the only virtual content on the HMD of Ramzi's goggles, overlaid on his view of the directory through the HMD and following the recognized location as Ramzi moves his head.

The above described systems and methods may be used to perform an image search locally in a bandwidth efficient manner based on context dependent search models, when the system is confident that one of the models will deliver high quality search results. This approach has the potential advantages of bandwidth savings, search accuracy, privacy protection, and distributed processing to ease the burden on centralized servers.

As a variation on the above described embodiments, the query 28 may include a secondary image selected by the user. The secondary image may be captured by the camera 34, or selected from an image collection, such as a photo collection stored locally on the computing device 10. The secondary image may be of an object, which may be an inanimate object such as a book or building, an animate object such as a person or animal, a place or scene, etc. The secondary image may have metadata associated with it, which was previously entered by a user, or programmatically generated by an image capture device or image analysis program. For example, the secondary image may be of a face of a recognized person and the metadata may be the person's name or other identifier, the image may be a recognized book and the metadata may be a title captured by OCR, the image may be of a recognized object and the metadata may indicate the type of object (e.g., "red coffee mug"), or the image may be a recognized place and the metadata may be the GPS coordinates of the place and the name of the place, as but a few examples. When using the secondary image as the query 28, typically the metadata in textual form is used as a text query for the image search. According to this embodiment, in the flowchart of FIG. 3, step 302 is accomplished by receiving a secondary image having associated pre-existing or programmatically generated metadata, as described above, and the search query is based on the metadata. Following step 302, the remaining steps proceed as described above.

In some embodiments, the methods and processes described herein may be tied to a computing system of one or more computing devices. In particular, such methods and processes may be implemented as a computer-application program or service, an application-programming interface (API), a library, and/or other computer-program product. Further, in some embodiments, all or a portion of the methods and processes may be implemented in hardware, such as in an application specific integrated circuit (ASIC), field programmable gate array (FPGA), etc.

Figure 6:
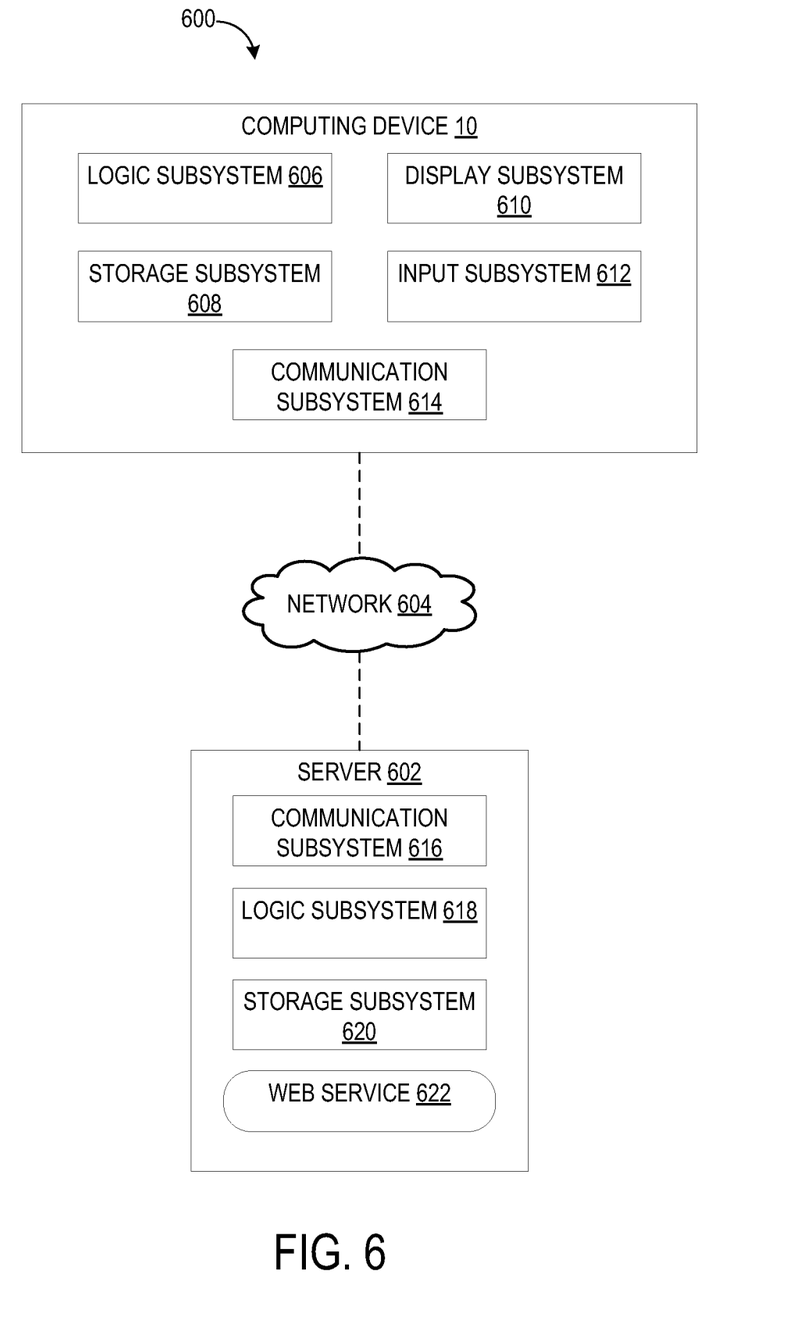
FIG. 6 shows a simplified schematic view of a computing system including the computing device.

FIG. 6 schematically shows a non-limiting embodiment of a computing system 600 that can enact one or more of the methods and processes described above. Computing device 10 connected to server 602 via network 604 may take the form of computing system 600. Computing system 600 is shown in simplified form. In different embodiments, computing system 600 may take the form of one or more personal computers, server computers, tablet computers, home-entertainment computers, network computing devices, gaming devices, mobile computing devices, mobile communication devices (e.g., smartphone), and/or other computing devices.

Computing system 600 includes a logic subsystem 606 and a storage subsystem 608. Computing system 600 may optionally include a display subsystem 610, input subsystem 612, communication subsystem 614, and/or other components not shown in FIG. 6. Server 602 may have an additional communication subsystem 616, logic subsystem 618, and storage system 620 and be configured to host a web service 622 as described above.

Logic subsystem 606 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystem configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 608 includes one or more physical devices configured to hold instructions executable by the logic subsystem to implement the methods and processes described herein. When such methods and processes are implemented, the state of storage subsystem 608 may be transformed—e.g., to hold different data.

Storage subsystem 608 may include removable and/or built-in devices. Storage subsystem 608 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 608 may include volatile, non-volatile, dynamic, static, read/write, read-only, random-access, sequential-access, location-addressable, file-addressable, and/or content-addressable devices.

It will be appreciated that storage subsystem 608 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 606 and storage subsystem 608 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," "subsystem," and "engine" may be used to describe an aspect of computing system 600 implemented to perform a particular function. In some cases, a module, program, subsystem, or engine may be instantiated via logic subsystem 606 executing instructions held by storage subsystem 608. It will be understood that different modules, programs, subsystems, and/or engines may be instantiated from the same application, service, code block, object, library, routine, API, function, etc. Likewise, the same module, program, subsystem, and/or engine may be instantiated by different applications, services, code blocks, objects, routines, APIs, functions, etc. The terms "module," "program," "subsystem," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 610 may be used to present a visual representation of data held by storage subsystem 608. This visual representation may take the form of a graphical user interface (GUI). As the herein described methods and processes change the data held by the storage subsystem, and thus transform the state of the storage machine, the state of display subsystem 610 may likewise be transformed to visually represent changes in the underlying data. Display subsystem 610 may include one or more display devices utilizing virtually any type of technology. Such display devices may be combined with logic subsystem 606 and/or storage subsystem 608 in a shared enclosure, or such display devices may be peripheral display devices.

When included, input subsystem 612 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 614 may be configured to communicatively couple computing system 600 with one or more other computing devices. Communication subsystem 614 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device having adaptable image search, the computing device comprising:
   non-volatile memory configured to store a plurality of image recognition models;
   an image recognition program executed by a processor of the computing device, the computing device being a user computing device, and the image recognition program configured to:
      receive a query from a user, the query comprising text that is typed or converted from speech;
      receive a target image within which a search based on the query is to be performed;
      rank the image recognition models by confidence level for performing the search based on at least a comparison between the query and respective text descriptions of the image recognition models;
      determine whether the confidence level of any of the image recognition models is above a confidence threshold; and
      upon determining that at least one confidence level of the image recognition models is above the confidence threshold,
         select at least one of the image recognition models whose confidence level is above the confidence threshold;
         perform the search within the target image for a target region of the target image using at least one selected image recognition model locally on the processor; and
         return a search result to the user.

2. The computing device of claim 1, wherein the target image is a single image or one or a plurality of image frames that constitute a portion of video.

3. The computing device of claim 1, wherein each image recognition model includes at least one of the following: an image recognition algorithm, an optical character recognition (OCR) algorithm, and a keyword matching algorithm.

4. The computing device of claim 1, wherein the image recognition program uses location information about the user.

5. The computing device of claim 1, wherein the target image is an image or video of the user's current surroundings and the query indicates a desired product or destination.

6. The computing device of claim 1, wherein the computing device comprises a camera and wherein the target image is captured by the camera.

7. The computing device of claim 1, wherein the computing device is a smartphone or tablet.

8. The computing device of claim 1, wherein the computing device is a watch or other wearable device.

9. The computing device of claim 1, wherein the image recognition program displays the search result on a head-up display.

10. The computing device of claim 1, wherein the query includes a directive to search for target regions in the target image or in other images that are similar to the target region in the target image.

11. A method for operating an image recognition program on a computing device having adaptable image search, the method comprising:
   executing the image recognition program on a processor of the computing device, the computing device being a user computing device;
   receiving a query from a user, the query comprising text that is typed or converted from speech;
   receiving a target image within which a search based on the query is to be performed;
   ranking a plurality of image recognition models by confidence level for performing the search based on at least a comparison between the query and respective text descriptions of the image recognition models, wherein the image recognition models are stored in non-volatile memory of the computing device;
   determining whether the confidence level of any of the image recognition models is above a confidence threshold; and
   upon determining that at least one confidence level of the image recognition models is above the confidence threshold,
      selecting at least one of the image recognition models whose confidence level is above the confidence threshold;
      performing the search within the target image for a target region of the target image using at least one selected image recognition model locally on the processor; and
      returning a search result to the user.

12. The method of claim 11, wherein each image recognition model includes at least one of the following: an image recognition algorithm, an optical character recognition (OCR) algorithm, and a keyword matching algorithm.

13. The method of claim 11, wherein the image recognition program uses location information about the user.

14. The method of claim 11, wherein the target image is an image or video of the user's current surroundings and the query indicates a desired product or destination.

15. The method of claim 11, wherein the computing device comprises a camera and wherein the target image is captured by the camera.

16. The method of claim 11, wherein the computing device is a smartphone or tablet.

17. The method of claim 11, wherein the image recognition program displays the search result on a head-up display.

18. The method of claim 11, further comprising, upon determining that none of the confidence levels of the image recognition models is above the confidence threshold:
connecting to a web service including a plurality of image recognition models;
receiving a ranking of image recognition models of the web service by confidence level for performing the search based on the query within the target image;
determining whether any of the image recognition models of the web service is above the confidence threshold for performing the search; and
upon determining that at least one confidence level of the image recognition models of the web service is above the confidence threshold,
selecting at least one of the image recognition models of the web service whose confidence level is above the confidence threshold;
downloading at least one selected image recognition model to the computing device;
performing the search within the target image for a target region of the target image using at least one downloaded image recognition model; and
returning the search result to the user.

19. The method of claim 11, further comprising, upon determining that none of the confidence levels of the image recognition models is above the confidence threshold:
performing a web image search in an image search engine, wherein the web image search is based on the query;
returning a predetermined number of example images;
selecting at least one example image from the predetermined number of example images;
creating an image recognition model based on at least one selected example image;
storing the created image recognition model in the non-volatile memory of the computing device;
performing the search within the target image for a target region of the target image using the created image recognition model; and
returning the search result to the user.

20. A computing device having adaptable image search, the computing device comprising:
non-volatile memory configured to store a plurality of image recognition models;
a camera, wherein a target image is captured by the camera and wherein the target image is a single image or one or a plurality of image frames that constitute a portion of video;
a head-up display; and
an image recognition program executed by a processor of the computing device, the computing device being a user computing device, and the image recognition program configured to:
receive a query from a user, the query comprising text that is typed or converted from speech;
receive the target image within which a search based on the query is to be performed;
rank the image recognition models by confidence level for performing the search based on at least a comparison between the query and respective text descriptions of the image recognition models;
determine whether the confidence level of any of the image recognition models is above a confidence threshold; and
upon determining that the confidence level of at least one of the image recognition models is above the confidence threshold,
select at least one of the image recognition models whose confidence level is above the confidence threshold;
perform the search within the target image for a target region of the target image using at least one selected image recognition model locally on the processor;
return a search result to the user; and
display the search result on the head-up display.

* * * * *